United States Patent Office 2,879,152
Patented Mar. 24, 1959

2,879,152

MANUFACTURE OF FERTILIZERS

Gordon A. Coleman, Philadelphia, Pa., assignor to Allied Chemical Corporation, a corporation of New York No Drawing. Application December 27, 1951
Serial No. 263,707

3 Claims. (Cl. 71—37)

This invention relates to the preparation of nitrogen-phosphate containing fertilizers and is particularly concerned with improved procedure for carrying out the process of manufacturing such fertilizers, which is described and claimed in copending U.S. application Serial No. 211,436, filed February 16, 1951, by E. W. Harvey and G. L. Frear, now Patent #2,680,679, involving acidulation of phosphate rock followed by ammoniation under certain conditions, the instant improvements being especially directed to the ammoniation operation.

In accordance with the process of the above Harvey-Frear application, phosphate rock (tricalcium phosphate) is treated with an acid medium containing $H_2SO_4$, e.g. aqueous sulfuric acid, the quantity of acid employed being more than sufficient to convert the phosphate content of the rock entirely to phosphoric acid, say 100% excess acid, and contacting the resulting mixture containing phosphoric acid, calcium sulfate and excess acid with an ammoniating agent, e.g. gaseous ammonia, in quantity sufficient to transform the free phosphoric acid and excess acidulating acid present essentially to dicalcium phosphate, ammonium phosphates and soluble ammonium compounds of such excess acidulating acid, e.g. ammonium sulfate. One of the chief advantages of the process of the Harvey-Frear application involves elimination of the comparatively long period required for curing the acid reaction mixture following acidulation and prior to ammoniation, in conventional ammoniated superphosphate manufacture.

It is noted in accordance with the Harvey-Frear application process, that ammoniation is preferably carried out in an aqueous medium, and that additional water may be introduced into the reaction mixture prior to ammoniation so that the acidulated mixture subjected to ammoniation may contain up to about 50% water. Under these conditions of ammoniation, it is stated in the above-mentioned application that about 5 to 9 mols of ammonia are used per 10 equivalents of total acid employed in the acidulation step, from about 6 to 8 mols of ammonia per 10 equivalents of acidulating acid giving good results where the quantity of excess acidulating acid is between 50 and 150%. Accordingly, while the Harvey-Frear process has been employed successfully in the production of fertilizers, at the dilutions of the reaction mixture subjected to ammoniation as described in the Harvey-Frear application, I have found that a substantial portion, often 20% to 30% or more, of the ammonia charged remains unabsorbed, resulting in an efficiency of ammoniation usually not exceeding about 80%, and often substantially lower. Efficiency of ammoniation, as employed herein, is defined as the percent of added ammonia which is absorbed in the reaction mixture. Further, at the dilutions maintained during ammoniation in the above-mentioned application process, particularly wherein no water or only a small amount of water is added to the acidulated reaction mixture prior to ammoniation, the heat evolved during ammoniation may cause a substantial amount of water to be evaporated, resulting in formation of a relatively thick pasty material wherein further absorption of ammonia becomes increasingly more difficult, and hence rate of absorption of ammonia correspondingly decreases. These conditions bring about loss of ammonia from the reactors and uneconomical operation.

As a measure of the dilution of the acidulated reaction mixture subjected to ammoniation, the term "apparent acid strength" (a.a.s.) employed throughout the specification and claims of the instant application expressed as per cent, is numerically equal to the $$\frac{\text{weight of 100\% acid employed in acidulation} \times 100}{\text{weight of aqueous acid employed in acidulation} + \text{weight of water used to dilute the acidulated reaction mixture}}$$

This definition accordingly represents the strength of acid which would have been present during acidulation based on the amount of water present in the reaction mixture at the commencement of ammoniation due to any additional water added prior thereto, and it is seen that the greater the dilution of the reaction mixture subjected to ammoniation, the lower will be the a.a.s. value.

The apparent acid strength of the acidulated reaction mixture subjected to ammoniation in accordance with the Harvey-Frear application process, is relatively high compared to the a.a.s. employed in the present process. Thus, the acid reaction mixture subjected to ammoniation in Example 2 of such application, following addition of 112 parts of water to form a mixture containing 50% water, corresponding to the greatest dilution of acid-phosphate rock mixture ammoniated in the examples in the Harvey-Frear application, had an a.a.s. value of 50

$$\left(\frac{188 \times .80 \times 100}{188 + 112}\right) \text{ percent}$$

One object of this invention is to prepare nitrogen-phosphate containing fertilizers by a simple improved procedure.

Another object is the provision of an improved process for preparing a fertilizer material containing a high percentage of $P_2O_5$ in available form, involving acidification of phosphate rock and treatment of the resulting mixture with an ammoniating medium under conditions to obtain maximum efficiency of ammoniation.

Yet another object is to furnish a process for conversion of phosphate rock to a nitrogen-phosphate base fertilizer wherein a substantial proportion of the phosphate content of the rock is in the form of dicalcium phosphate, involving acidulation of the rock using an acid medium containing sulfuric acid followed directly by ammoniation without the necessity for curing the acidulated material prior thereto in order to complete the acid reaction, ammoniation taking place at high efficiency and at a high ammonia absorption rate.

Another aim of the invention is to provide a continuous process for making a granular nitrogen-phosphate base fertilizer of high uniformity, stable salt components and free-flowing characteristics, and having its phosphate content chiefly in the form of dicalcium phosphate and ammonium phosphates, by acidulating phosphate rock with an acid medium containing a substantial proportion of sulfuric acid and ammoniating the resulting reaction mixture, without curing it, under certain conditions of dilution to obtain a high efficiency of ammoniation and a high ammonia absorption rate.

Still another object of the invention is the preparation of a stable, free-flowing "complete" fertilizer containing the required amounts of phosphorus (as available $P_2O_5$), nitrogen and other conventional fertilizer elements, e.g. potash salts, in a single continuous operation and eliminating the curing periods both before and after ammoniation usually required in conventional processes for production of "complete" fertilizers, at least a substantial portion of the nitrogen content of the fertilizer being supplied by ammoniation of acid-phosphate rock mixtures containing excess acid, at high ammonia efficiency and ammonia absorption rates.

A further object is the provision of a more economical process for making nitrogen-phosphate base fertilizers by sulfuric acid acidulation of phosphate rock followed by ammoniation under dilution conditions resulting in high ammonia efficiency and ammonia absorption rates, such process affording enhanced product capacity and greater economy of operation.

A still further object is to provide a process in accordance with the foregoing objects wherein ammoniation is carried out in conjunction with subsequent processing operations whereby evaporation of relatively large amounts of water from the ammoniated reaction mixture is avoided and continuous operation of the process is facilitated.

Other objects and advantages will appear from the following description of the invention.

Pursuant to the foregoing objects, I have now unexpectedly found that in the process for preparing a fertilizer material, especially in accordance with the above Harvey-Frear application, i.e. by treating phosphate rock with an acid medium containing $H_2SO_4$ in a proportion of at least about 2 equivalents per 3 equivalents of any other acid constituents present, the amount of total acid present being substantially in excess of that theoretically required to convert the phosphate content of the rock substantially to phosphoric acid, and reacting the resulting mixture containing $H_3PO_4$ and $CaSO_4$, without any intervening curing period, with an ammoniating agent in amount sufficient to transform a major portion of the phosphate content of said mixture to dicalcium phosphate and ammonium phosphates, the ammoniation efficiency and rate of absorption of ammonia may be increased by adding to the acidulated reaction mixture prior to ammoniation thereof, an amount of water sufficient to decrease the apparent acid strength of said mixture to between 35% and 15%. In accordance with a preferred embodiment of the instant invention, most of the undissolved solids in the ammoniated reaction mixture, which is in fluid condition, are recovered therefrom as product, and the remaining aqueous liquor is recycled by addition to a succeeding acidulated reaction mixture to be ammoniated.

By practice of the invention improvements, a valuable nitrogen-phosphate base fertilizer similar to that of the Harvey-Frear application, having good physical characteristics, i. e. uniformity, salt stability and freedom of flow, and having a high portion of its $P_2O_5$ content in plant available form, is obtainable more rapidly and at higher capacity and lower cost, involving use of smaller amounts of ammonia during ammoniation, thus avoiding ammonia losses, along with greater ammonia absorption rates.

In one mode of carrying out the invention, phosphate rock is first treated with an aqueous solution of sulfuric acid, the solution containing a proportion of $H_2SO_4$ of at least 2 equivalents, amounting to one mol of $H_2SO_4$, in excess of that theoretically required to convert the $P_2O_5$ content of the rock entirely to phosphoric acid, i. e. $x$ in the illustrative equation below is at least 1, the total amount of acid used accordingly being at least 8 equivalents (4 mols $H_2SO_4$) per mol of $Ca_3(PO_4)_2$ or per mol of $P_2O_5$ in the rock:

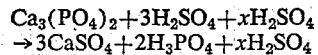

$$Ca_3(PO_4)_2 + 3H_2SO_4 + xH_2SO_4$$
$$\rightarrow 3CaSO_4 + 2H_3PO_4 + xH_2SO_4$$

In the above equation, the value $x$, representing mols of excess $H_2SO_4$ employed, as in the case of the Harvey-Frear application, may be as high as 9, but is generally in the range of 1 to 6. Hence, the amount of excess acid employed constitutes a minimum of 33% and a maximum of 300%, and is usually in the range of 33–200%, preferably 50–150%, of that theoretically required for conversion of the tricalcium phosphate or $P_2O_5$ content of the rock completely to phosphoric acid.

In a modification of the above-described acidulation operation employing sulfuric acid alone as acidulating agent, mixtures of sulfuric and nitric acids may be substituted for the sulfuric acid, to thereby obtain nitrogen-phosphate base fertilizer mixtures in which a part of the ammonium sulfate formed from the excess sulfuric acid is replaced by ammonium nitrate produced from the excess nitric acid on ammoniation. In still another modification, the acidulating medium may consist of mixtures of sulfuric and phosphoric acid, or of sulfuric, nitric and phosphoric acids. The phosphoric acid in such acidulating media has as its main function the introduction of further quantities of available $P_2O_5$ into the fertilizer product.

In each of the foregoing modifications, the acid medium employed should contain at least about 2 equivalents of $H_2SO_4$ per 3 equivalents of other acids present, e. g. $HNO_3$, $H_3PO_4$, or $HNO_3$ and $H_3PO_4$. However, regardless of the particular acidulating medium of the invention employed, the chief acidulating agent is generally considered to be the sulfuric acid present therein, although the presence of other acids, e. g. $HNO_3$ or $H_3PO_4$, may facilitate the reaction. Where only sulfuric acid is employed as the acidulating medium, the acidulated reaction mixture will contain essentially phosphoric acid, calcium sulfate and excess sulfuric acid; where mixtures of sulfuric and nitric acids are used, the acidulated reaction mixture may contain phosphoric acid, nitric acid, calcium sulfate and calcium nitrate in the case where the amount of sulfuric acid present is not sufficient to react with all of the tricalcium phosphate of the rock. Under the circumstances of the presence of more sulfuric acid in the sulfuric-nitric acid acidulation mixture than will react with all of the tricalcium phosphate, the reaction mixture will be composed essentially of phosphoric acid, sulfuric acid, nitric acid and calcium sulfate, substantially no calcium nitrate being formed.

The acidulation reaction is exothermic, reaction temperatures during acidification usually being in the range 50–150° C. The time required for complete reaction will depend upon the original composition and particle size of the phosphate rock, the composition, concentration and temperature of the acid medium employed, the proportion of acid to phosphate to be reacted upon and the intensity of agitation of the mixture. Combinations of conditions may be selected which will permit the reaction to be carried out in a matter of as little as 5 minutes or less.

While it is desirable to maintain the amount of water present in the rock-acid mixture throughout the acidulation reaction at a minimum, in ordinary practice, some mater may be present in the reaction mixture as result of the use of inexpensive commercial aqueous acids, e. g. aqueous sulfuric and nitric acids. Thus, for example, in practical operation of the process, aqueous solutions of sulfuric acid of say 40–95% strength, usually 60–95%, may be employed.

The completely reacted mixture from the acidulation step, may then be brought immediately into contact with an ammoniating agent. The ammoniating agent may be gaseous or liquid anhydrous ammonia, aqueous ammonia solutions or solutions of ammonium nitrate and/or urea in anhydrous ammonia or aqueous ammonia. Anhydrous gaseous ammonia is preferred chiefly for economic reasons. The proportion of free ammonia in the ammoniating medium employed should be sufficient to neutralize the free acid content of the mixture and to transform substantially all of the phosphoric acid, excess acid and a substantial proportion of the calcium sulfate therein, to dicalcium phosphate and ammonium phosphates as the essential available phosphate-bearing materials, and to other soluble ammonium compounds such as ammonium sulfate.

In accordance with the main feature of the invention, an amount of water is added to the acidulated reaction mixture prior to ammoniation thereof, sufficient to decrease its apparent acid strength to between 35% and 15%. I have further found that the greatest improvement with respect to ammoniation efficiency occurs when such dilution is carried out so as to afford a.a.s. values within the range of 15% to 25%. Thus, by practice of the invention principles ammoniation efficiencies over 80% are readily attainable, and particularly when operating within an a.a.s. range of about 20% to 25%, an ammoniating efficiency of 95% or more may be realized. Moreover, on ammoniation at a.a.s. values for the acidulated reaction mixture within the foregoing ranges, an unexpected increase in rate of ammonia absorption also was observed, and it was noted that ammoniation was essentially complete even at relatively high rates of ammonia addition.

I have ascertained that the increases in ammoniation efficiency and rate of ammonia absorption realized by means of the present invention are not due simply to increasing the amount of water present in the acid reaction mixture to thereby merely afford a greater volume of aqueous reaction medium in which greater amounts of ammonia will dissolve. This is evident by reason of the fact that when ammoniation is brought about at dilutions in excess of those noted herein, corresponding to acidulated reaction mixtuers having a.a.s. values less than 15%, the benefits of the invention are not secured to the extent and with the facility realized when operating at the above a.a.s. of 15% to 35%, and particularly within the narrower 15% to 25% a.a.s. range. While I am not certain as to why ammoniation within the 15–35% a.a.s. range produces the advantages noted herein, it is my belief this is due at least in part to the highly complex chemical reactions taking place during this type of ammoniation, involving ion exchange, rearrangement, formation of double salts and the like. For example, it is known that during ammoniation according to the invention process a calcium sulfate-potassium sulfate-water complex is formed. Examination of the ammoniated slurry by X-ray diffraction indicates the presence of other salt complexes. Further, the beneficial results produced by ammoniation in accordance with the invention principles may also be due in some manner to the thixotropic tendencies of the slurry undergoing ammoniation. However, the invention is not to be construed as limited in any way by the foregoing theories.

In the ammoniation reaction according to the instant improvements, a proportion of about 2 to 8 mols of ammonia is generally used per 10 equivalents of total acid employed in acidulation, and from about 3 to 7 mols of ammonia per 10 equivalents of such acid are utilized where the quantity of excess acidulating acid is in the preferred 50 to 150% range. While it is seen that in the instant process utilizing the a.a.s. values noted above, a substantially greater percentage of the ammonia charged is absorbed as compared to the Harvey-Frear application process, wherein 5 to 9 mols of ammonia are used per 10 equivalents of total acid, thus enhancing the ammoniation efficiency, the rate of ammonia absorption herein is also greater than in the Harvey-Frear process.

The ammoniation reaction hereof is exothermic and takes place generally at temperatures not in excess of 110° C. and preferably at temperature not exceeding 85° C. When employing ammoniating temperatures above 110° C., some reversion to citrate-insoluble $P_2O_5$ tends to take place. During ammoniation according to the instant process, the pH of the reaction mixture should not exceed 9 and in best operation, should not exceed 7. In conjunction with the dilution principles of the invention, ammoniation up to a reaction mixture pH of about 7 or below, say 6 to 7, often results in ammoniating efficiencies approaching 100%. If ammoniation is carried out up to a pH of not more than 9, the amount of reversion of $P_2O_5$ to citrate-insoluble form, which is unavailable as a fertilizer, is comparatively small, while if carried out above pH 9, such undesirable reversion rapidly increases. Ordinarily, an odor of ammonia is detectable above the reaction mixture when the pH reaches 7 to 8 during ammoniation, indicating ammoniation should not be carried much further.

As the ammoniation reaction progresses, the pH of the reaction mixture gradually increases and a major portion of the $P_2O_5$ content of the mixture gradually changes from an essentially water-soluble form, as represented by $H_3PO_4$ and $Ca(H_2PO_4)_2$ (monocalcium phosphate), to a water-insoluble but citrate-soluble form as represented by dicalcium phosphate, one of the most important constituents of the final fertilizer product. If ammoniation of reaction mixtures prepared using $H_2SO_4$ as sole acidulating agent should be continued to pH above 9, thus forming relatively large amounts of citrate-insoluble $P_2O_5$, the reaction mixture may be acidified to lower the pH back to the desired value. This back acidification to a given pH, say 8, returns or lowers the citrate-insoluble value back to that which was obtained when this given pH was first reached during the reaction with ammonia. The presence of potassium chloride in the reaction mixture undergoing ammoniation, while apparently affecting the citrate-insoluble $P_2O_5$ value at a particular pH, does not appear to affect this reversibility of reaction on acidulation of the above over-ammoniated mixtures.

The ammoniation reaction may take place in open or closed vessels and for best results, intense agitation should be maintained during the addition of the ammoniating agent, e.g., the preferred gaseous ammonia. For this purpose large blade, low speed agitators are most effective to maintain the solids in suspension at all times during the reaction period. In accordance with the invention, the reaction mixture is generally in the form of a highly mobile slurry at the beginning, during and after ammoniation. The time of ammoniation may be very short, say as little as 10 minutes or less, although longer periods of ammoniation may be utilized in the invention depending upon the conditions of ammoniation, the composition of the reaction mixture to be ammoniated, etc.

In ammoniation at comparatively high dilutions according to the invention principles, provision must be made for removal of large quantities of water from the product. Conventional means for this purpose, e.g. evaporation, are costly and time consuming. Hence, as an additional feature of the present invention, most of the undissolved solids in the ammoniated reaction mixture, usually in the form of a thin slurry, are removed as product by settling, filtering or preferably centrifuging the slurry, and the remaining aqueous liquor is recycled by addition to a succeeding acidulated reaction mixture to be ammoniated. If desired, the ammoniated slurry may be run to settling basins or through thickeners or decanters prior to or in lieu of filtering or centrifuging. If settling basins or thickeners are employed without subsequent filtering, the sludge may be removed periodically for drying. The water in the aqueous liquor thus recycled constitutes a portion, usually the major portion, of the water required to be added to the acidulated reaction mixture to dilute it to the desired a.a.s. value prior to ammoniation in accordance with the invention.

After several cycles of operation, the aqueous mother liquor or filtrate recycled as herein noted becomes saturated with all of the water soluble components of the ammoniated reaction mixture. When such a so-called "steady state" has been attained, practically all of the reaction materials thereafter formed on ammoniation are precipitated in the reaction medium and are collected as product in the filter cake obtained in the subsequent filtration or centrifuging step. By operating in the foregoing manner, only enough water is added to the mixture of acidulated reaction mass and recycled aqueous liquor in each cycle, to replace the water removed in the wet filter cake, and a mixed fertilizer is accordingly produced from this wet filter cake by evaporation of a comparatively small amount of water therefrom, the final fertilizer being then ready for bagging and storage.

To speed up operation and secure maximum capacity, no attempt is ordinarily made to obtain a completely clear filtrate after separation of solids from the ammoniated reaction mixture, and the mother liquor recycled as noted above may thus have some solids suspended therein. The total amount of solids (both dissolved and suspended) in the aqueous liquor thus recycled may vary from say 10 to 50% or more, a concentration of solids approaching the high value in this range being reached after several perhaps 10 to 15 cycles, of operation. Using sulfuric acid for acidulation, such aqueous mother liquor contains ingredients such as to provide in solution the phosphate, sulfate, ammonium and calcium ions. Where mixtures of sulfuric and nitric acids are employed for acidulation, the nitrate ion is also present. If potassium chloride has been added at a suitable stage of the process, the ammoniated mixture may also contain the potassium and chloride ions. An analysis of typical filtrates produced according to the invention principles is set out in Table I below:

*Table I*

| Run Number | 1 | 2 | 3 |
| --- | --- | --- | --- |
| Type of Acidulation | $H_2SO_4$ | $H_2SO_4$ | 0.6 mol $HNO_3$ / 1.0 mol $H_2SO_4$ |
| Number of Runs in Series | 14 | 3 | 10 |
| pH of Slurry before Filtration | 5.6 | 7.0 | 6.5 |
| Filtrate Analysis: | | | |
| Percent Total $P_2O_5$ | 7.8 | 1.96 | 0.32 |
| Percent K calculated as $K_2O$ | 2.45 | 2.01 | 4.12 |
| Percent N as $NH_3$ | 8.16 | 7.76 | 8.40 |
| Percent N as $NO_3^-$ | 0 | 0 | 4.40 |
| Percent $Cl^-$ | 7.37 | 6.11 | 7.77 |
| Percent $SO_4^-$ | 15.0 | 19.3 | 7.98 |
| Percent CaO | 0.03 | 0.01 | 0.0 |
| Percent Total Solids | 45.1 | 39.2 | 49.3 |
| Centrifuge Cake Analysis, Percent (Dry Basis): | | | |
| Total $P_2O_5$ | 10.2 | 9.93 | 16.2 |
| Citrate-soluble $P_2O_5$ | 10.1 | 8.63 | 13.6 |
| Citrate-insoluble $P_2O_5$ | 0.13 | 1.30 | 2.60 |
| Percent calculated as $K_2O$ | 9.59 | 12.3 | 10.9 |
| N as $NH_3$ | 7.61 | 6.81 | 6.60 |
| N as $NO_3^-$ | 0 | 0 | 2.45 |
| Percent $H_2O$ in cake before drying | 23.5 | 28.28 | 21.1 |

A comparison of results between runs 1, 2 and 3 of the above table shows that the composition of the filtrate varies mostly with the type of acidulating acid employed and with the pH of the slurry from which it is obtained.

The foregoing recycling procedure renders the process herein particularly adaptable to continuous operation, which is preferred in commercial practice for high efficiency and capacity.

The filter cake obtained on the separation of the major portion of solids from the ammoniated reaction mixture generally contains not more than about 35% water, and often substantially less than this amount. This water may be removed from the product by drying, e. g. in a vacuum or rotary dryer, and the resulting material granulated. The product may be dried at temperatures between 100 and 150° C.

The final fertilizer product hereof is of a uniform, chemically stable, free-flowing, non-caking and granular nature. Such product may be bagged without the usual curing period following ammoniation. When using sulfuric acid as acidulating agent, the product of ammoniation contains principally dicalcium phosphate, ammonium phosphates and ammonium sulfate, along with calcium sulfate, some insoluble phosphate, reaction products of these materials with potash salts where the latter have been added at a suitable stage in the process, plus a small amount of moisture. The product of ammoniation of the acid-phosphate mixture using $H_2SO_4$–$HNO_3$ mixtures as acidulating agent in the manner described above, may contain principally dicalcium phosphate, ammonium phosphates, ammonium nitrate and ammonium sulfate, along with calcium sulfate, some insoluble phosphate and other impurities. The above is not to be construed as an exact enumeration of the crystalline substances contained in the stabilized fertilizer product, since it is to be understood that various double salts and solid solutions of these substances are probably present.

When using $H_2SO_4$ alone as acidulating medium, the fertilizer product may contain say 7–15% by weight (exclusive of potash salts) of available citrate-soluble $P_2O_5$ and may have 6–13% available nitrogen content. When employing mixtures of nitric and sulfuric acids for acidulation, the final product may contain the above-noted percentage of available $P_2O_5$ and about 8–19% available nitrogen.

In addition to the incorporation of potash values or potash salts such as KCl and $K_2SO_4$ into the fertilizer material at a suitable stage, i. e. prior to, during or subsequent to ammoniation, to provide potassium values, other fertilizer ingredients may also be introduced in like manner into the nitrogen-phosphate containing compositions hereof to produce a "complete" fertilizer. These include minor constituents such as compounds of boron, manganese, copper and zinc, and so-called dusting agents, e.g. diatomaceous earth, clays, finely ground dolomite and magnesium silicate, to enhance the free-flowing characteristics of the fertilizer product.

The following examples are illustrative of the process of the invention, all quantities being expressed in parts by weight:

*Example 1.*—A series of runs was made by acidulating phosphate rock with aqueous sulfuric acid containing an amount of $H_2SO_4$ in excess of that required to convert all of the $P_2O_5$ content of the rock to $H_3PO_4$. Water in various quantities was added to the resulting acidulated reaction mixture to form a slurry, and gaseous ammonia was then introduced therein. KCl was added after ammoniation in these runs. Following ammoniation, the reaction mixture was filtered and dried.

Data and results of these runs are noted in Table II below:

*Table II*

| Run Number | 4 | 5 | 6 |
| --- | --- | --- | --- |
| Acidulation: | | | |
| Rock Charged, parts | 25 | 25 | 20 |
| $H_2SO_4$: | | | |
| Parts | 40.6 | 40.6 | 32.3 |
| Percent Acid | 92.3 | 92.3 | 92.8 |
| Temperature, ° C | 80 | 80 | 80 |
| Time for Acidulation, Min | 10 | 10 | 10 |
| Ammoniation: | | | |
| Water added, parts | 12.5 | 25 | 60 |
| Apparent acid Strength, percent | 70.5 | 57.2 | 32.5 |
| $NH_3$ Charge, parts | 18.6 | 22.5 | 9.2 |
| Time for Ammoniation, Min | 185 | 135 | 90 |
| Maximum Temperature, ° C | 112 | 106 | 100 |
| Final pH | 6.9 | 7.6 | 6.7 |
| KCl added, parts | 13.5 | 13.5 | 10.8 |
| $NH_3$ Efficiency, percent | 55.1 | 43.2 | 87.8 |

It is seen from the above Table II that for runs 4 and 5, wherein the a.a.s. values for the reaction mixtures undergoing ammoniation were 70.5% and 57.2%, respectively, the ammoniation efficiency was 55.1% and 43.2%, respectively, whereas for run 6, carried out under dilution conditions such that the a.a.s. value for the reaction mixture undergoing ammoniation was 32.5, within the 15–35% a.a.s. range of the invention, the ammoniating efficiency was much higher, i.e. 87.8%.

*Example 2.*—Another series of runs was made by acidulating, in each case, phosphate rock with aqueous sulfuric acid, adding 50 parts of water to the acidulated reaction mixture contained in an open tank and then introducing gaseous ammonia into the resulting mixture with agitation thereof. After ammoniation, potassium chloride was added to the mixture and the batch was then placed in trays and dried in a vacuum dryer, followed by granulation to produce the final product.

Analyses and results of these runs are set forth in Table III below:

Table III

| Run Number | 7 | 8 | 9 |
|---|---|---|---|
| Acidulation: | | | |
| Rock Charged, parts | 10 | 30.0 | 10 |
| $H_2SO_4$: | | | |
| Parts | 15.9 | 48.3 | 16.1 |
| Percent acid | 95.4 | 93.2 | 93.4 |
| Temperature, °C | 80 | 80 | 80 |
| Time for Acidulation, Min | 10 | 20 | 10 |
| Ammoniation: | | | |
| Acidulated Mass Charged, parts | 21 | 25 | 30 |
| Water Charged, parts | 50 | 50 | 50 |
| Apparent Acid Strength, percent | 19.4 | 22.0 | 25.2 |
| Ammonia Added, parts | 4.0 | 3.8 | 3.5 |
| Maximum Temperature, °C | 70 | 85 | 83 |
| Final pH | 7.2 | 5.9 | 6.2 |
| KCl added, parts | 5.4 | 5.6 | 8.1 |
| $NH_3$ Efficiency, percent | 82.5 | 94.2 | 100 (approx.) |
| Analyses of Dried Product: | | | |
| pH | 5.0 | 4.8 | 4.1 |
| Percent $H_2O$ | 1.9 | 1.91 | 1.97 |
| Percent $NH_3$ | 11.8 | 11.0 | 8.70 |
| Percent Total $P_2O_5$ | 7.2 | 9.9 | 10.9 |
| Percent Citrate-insoluble $P_2O_5$ | 0.15 | 0.52 | 0.33 |
| Percent K as $K_2O$ | 12.15 | 11.1 | 12.3 |
| Percent Other ingredients | | | |

As noted from Table III above, the ammoniating efficiencies for runs 7, 8 and 9 were 82.5, 94.2 and about 100%, respectively, where the a.a.s. values for the reaction mixtures undergoing ammoniation were 19.4, 22 and 25.2, respectively, in accordance with the invention.

*Example 3.*—About 22 parts of an acidulated phosphate rock mixture produced by treating 36 parts of phosphate rock with about 58 parts of about 94% $H_2SO_4$, were mixed with 50 parts of water in an agitated tank. To this reaction mixture was added about 2.9 parts gaseous ammonia, after which about 4.6 parts potassium chloride were added. The mass was then stirred for about 10 minutes and filtered, producing about 31 parts of filter cake and about 55 parts of filtrate. The filtrate was then mixed with another 22 parts of acidulated phosphate rock and 2.9 parts gaseous ammonia were again added, followed by addition of 4.6 parts potassium chloride as in the previous operation. On filtration, the yield of filtrate, which was saved for dilution of fresh acidulated rock in a subsequent cycle, was 47 parts and about 34 parts of filter cake were obtained containing 31.5% water, its composition on a dry basis being 9.2% total $P_2O_5$, 0.019% citrate-insoluble $P_2O_5$, about 6.0% nitrogen and 10.7% $K_2O$.

*Example 4.*—A series of runs was made involving recycling during ammoniation. An acidulated reaction mixture was first prepared by reacting 15 parts of phosphate rock with 24 parts aqueous sulfuric acid of 93.8% strength for about 10 minutes. To 22 parts of the acidulated mixture were added 50 parts of water and the resulting mixture ammoniated. Following ammoniation, potassium chloride was added, the resulting slurry filtered and the filtrate recycled by combining it with another 22 parts of acidulated reaction mixture. This combined mixture was adjusted by addition of makeup water to the same volume as the initial slurry subjected to ammoniation. A series of succeeding ammoniation cycles was then carried out in the same way. Ammoniation in the various runs was continued up to a final pH ranging from 5.6 to 6.8, the a.a.s. value of each of the mixtures subjected to ammoniation being maintained substantially constant at about 26.5%. The average ammoniation efficiency for all of the runs made was in the neighborhood of 100%. Results and analyses for these runs are noted in Table IV below:

Table IV

| Run No. | Charge, Parts | | | | | Final pH | Ammoniation Temp., °C., Max. | Filtration, Parts | | | Analysis of Dried Product, Percent | | | | |
|---|---|---|---|---|---|---|---|---|---|---|---|---|---|---|---|
| | Acidulated Mass | Water | Recycled Filtrate | $NH_3$ | KCl | | | Filter Cake | Filtrate | Percent $H_2O$ in Filter Cake | Total $P_2O_5$ | Citrate Insol. $P_2O_5$ | N | $K_2O$ | pH |
| 10 | 22 | 50 | 0 | 3.25 | 4.56 | 5.6 | 49 | 26.1 | 48.1 | 44.7 | 8.7 | 0.09 | 2.2 | 5.6 | 4.6 |
| 11 | 22 | 9.3 | 48.1 | 3.25 | 4.56 | 5.7 | 57 | 35.5 | 42.2 | 31.1 | 9.2 | 0.08 | 4.1 | 14.4 | 4.4 |
| 12 | 22 | 14.9 | 42.2 | 3.00 | 4.56 | 5.6 | 51 | 34.6 | 44.9 | 35.2 | 9.9 | 0.03 | 7.0 | 11.0 | 4.2 |
| 13 | 22 | 11.3 | 44.9 | 3.44 | 4.56 | 5.7 | 45 | 37.1 | 47.2 | 29.2 | 15.0 | 0.07 | 7.1 | 9.0 | 4.4 |
| 14 | 22 | 12.3 | 47.2 | 3.56 | 4.56 | 5.6 | 80 | 29.6 | 53.6 | 28.3 | 11.4 | 0.03 | 7.5 | 8.5 | 4.6 |
| 15 | 22 | 8.6 | 53.6 | 3.93 | 4.56 | 6.5 | 69 | 36.6 | 50.6 | 24.5 | 11.7 | 0.16 | 9.5 | 10.4 | 4.2 |
| 16 | 22 | 10.5 | 50.6 | 3.38 | 4.81 | 6.7 | 41 | 33.7 | 47.8 | 24.6 | 8.9 | 0.08 | 7.5 | 12.2 | 4.2 |
| 17 | 22 | 11.0 | 47.8 | 3.38 | 4.81 | 6.6 | 50 | 42.6 | 42.3 | 29.3 | 9.6 | 0.12 | 9.1 | 10.4 | 3.8 |
| 18 | 22 | 12.8 | 42.3 | 3.50 | 0 | 6.8 | 57 | 33.7 | 42.0 | 32.5 | 13.4 | 0.08 | 9.7 | 2.8 | 4.6 |
| 19 | 22 | 18.0 | 42.0 | 3.38 | 4.81 | 6.7 | 50 | 33.4 | 45.7 | 23.1 | 11.7 | 0.04 | 7.6 | 8.0 | 4.4 |
| 20 | 22 | 18.3 | 45.7 | 3.38 | 4.81 | 6.6 | 52 | 34.0 | 48.4 | 26.0 | 10.3 | 0.11 | 5.2 | 9.7 | 4.9 |
| Averages (runs 15 to 20) | | 13.2 | 47.0 | 3.49 | 4.76 | 6.7 | 53 | 35.7 | 46.1 | 26.7 | 10.9 | 0.10 | 8.1 | 10.1 | 4.3 |

*Example 5.*—A series of runs was carried out in a manner similar to that of Example 4, but wherein the acidulated reaction mixture employed was prepared by reacting 12 parts of phosphate rock with an acid mixture consisting of 10 parts of aqueous sulfuric acid of 93.8% $H_2SO_4$ strength and about 10.6 parts of aqueous nitric acid containing about 67% $HNO_3$. This acid mixture contained a ratio of about 1.17 mols of $HNO_3$ per mol of $H_2SO_4$, or about 6 equivalents of $H_2SO_4$ per 3 equivalents of $HNO_3$. In these runs ammoniation was carried out to a final pH ranging from 6.5 to 8.0. The a.a.s. value of each of the reaction mixtures subjected to ammoniation was maintained at about 23%, and the average ammoniation efficiency for all of the runs was about 100%. Table V below shows the data and results for these runs:

Table V

| Run No. | Charge, Parts | | | | | Final pH | Filtration, Parts | | | Analysis of Dried Product, Percent | | | | | | |
| --- | --- | --- | --- | --- | --- | --- | --- | --- | --- | --- | --- | --- | --- | --- | --- | --- |
| | Acidulated Mass | Water | Recycled Filtrate | $NH_3$ | KCl | | Filter Cake | Filtrate | Percent $H_2O$ in Filter Cake | Total $P_2O_5$ | Citrate Insol. $P_2O_5$ | $K_2O$ | N ($NH_3$) | N ($NO_3$) | Total N | pH |
| 21 | 22 | 50 | 0 | 2.94 | 5.13 | 6.7 | 21.5 | 55.5 | 41.3 | 18.9 | 1.81 | 9.8 | 2.0 | 0.9 | 2.9 | 4.8 |
| 22 | 22 | 0 | 54.8 | 2.50 | 5.13 | 6.6 | 32.4 | 41.2 | 30.0 | 11.1 | 0.75 | 14.4 | 4.7 | 1.7 | 6.4 | 4.3 |
| 23 | 20 | 17.3 | 41.3 | 2.13 | 4.25 | 6.5 | 31.6 | 51.1 | 29.1 | 12.3 | 0.53 | 12.4 | 5.1 | 1.7 | 6.8 | 4.0 |
| 24 | 20 | 8.3 | 50.4 | 2.31 | 4.25 | 6.8 | 25.9 | 53.9 | 31.8 | 13.8 | 0.57 | 12.2 | 5.3 | 2.2 | 7.5 | 4.2 |
| 25 | 20 | 0 | 53.8 | 2.25 | 4.25 | 6.5 | 32.5 | 40.5 | 28.3 | 10.8 | 0.04 | 11.2 | 7.1 | 3.4 | 10.6 | 4.9 |
| 26 | 20 | 21.0 | 40.5 | 2.38 | 4.25 | 6.8 | 26.1 | 56.2 | 36.3 | 21.4 | 0.52 | 7.8 | 7.4 | 3.3 | 10.6 | 4.6 |
| 27 | 20 | 12.0 | 56.2 | 2.69 | 4.25 | 6.8 | 25.5 | 58.0 | 26.0 | 13.5 | 0.61 | 11.1 | 6.2 | 2.4 | 8.7 | 5.7 |
| 28 | 20 | 0 | 58.0 | 1.31 | 4.25 | 6.7 | 27.1 | 47.1 | 15.7 | 12.4 | 1.00 | 13.2 | 9.3 | 2.1 | 11.4 | 5.7 |
| 29 | 20 | 13.8 | 47.1 | 2.88 | 4.25 | 6.6 | 25.9 | 55.9 | 25.3 | 11.0 | 0.95 | 11.0 | 6.9 | 3.3 | 10.2 | 5.1 |
| 30 | 20 | 9.8 | 55.9 | 2.40 | 4.25 | 6.5 | 20.6 | 63.7 | 21.1 | 16.2 | 0.26 | 10.9 | 6.6 | 2.4 | 9.0 | 5.9 |
| 31 | 20 | 21.0 | 63.1 | 2.90 | 4.25 | 8.0 | 26.6 | 73.2 | 36.5 | 13.6 | 0.28 | 8.7 | 6.5 | 2.9 | 9.4 | 5.5 |
| Averages, last 4 runs | 20 | 11.2 | 56.0 | 2.37 | 4.25 | 6.9 | 25.5 | 60.0 | 24.6 | 13.3 | 0.62 | 11.0 | 7.3 | 2.7 | 10.0 | 5.6 |

From the foregoing, it is apparent the instant invention constitutes a valuable improvement for making nitrogen-phosphate base fertilizers. Thus, in accordance with the invention principles, (1) essentially complete absorption of ammonia may be attained during the ammoniation reaction, (2) such absorption occurs very rapidly, (3) since ammonia absorption is virtually complete, loss of ammonia or provision of a system for its recovery is eliminated, (4) by ammoniating in the thin slurries employed herein, adequate agitation can be provided with simple, inexpensive equipment having only a small power requirement, (5) the water needed for dilution of the mass to be ammoniated is added after acidulation of the phosphate rock with relatively concentrated acid, whereby acidulation and ammoniation are both effected rapidly and efficiently, (6) reversion of $P_2O_5$ to unavailable forms is largely eliminated or minimized and (7) the necessity for evaporating water from the ammoniated product is greatly reduced by recycling aqueous liquor, after removal of solids therefrom, to a fresh acidulated reaction mixture to be ammoniated, whereby on succeeding cycles of operation, a saturated recycle solution is secured wherein practically all of the reaction products subsequently formed by ammoniation are precipitated as solids and recovered to produce a valuable nitrogen-phosphate containing fertilizer material.

Since various changes and modifications may be made in the invention without departing from the spirit thereof, the invention is to be taken as limited only by the scope of the appended claims.

I claim:

1. A continuous process for preparing a nitrogen-phosphate base fertilizer which comprises reacting phosphate rock with an aqueous solution of $H_2SO_4$ and $HNO_3$ for a period of time sufficient to convert substantially the entire phosphate content of said rock to $H_3PO_4$, there being at least about 2 equivalents of $H_2SO_4$ present in said solution per 3 equivalents of $HNO_3$, the total amount of acid present being 33-200% in excess of that theoretically required to effect said conversion to $H_3PO_4$ and the water content of the reaction mixture being 8 to 120 parts per 100 parts of phosphate rock giving a mixture with an apparent acid strength of at least about 50%, adding water to the acidulated reaction mixture in an amount sufficient to decrease the apparent acid strength of said mixture to within the range of 15% to 25%, subjecting the resulting aqueous mixture comprising $CaSO_4$, $H_3PO_4$ and excess acid, without any previous curing step, to reaction with gaseous ammonia at a maximum temperature not exceeding 85° C. and at a maximum pH not exceeding 7 for a period of time sufficient to transform substantially all of said $H_3PO_4$ to dicalcium phosphate and ammonium phosphates, said aqueous mixture being in the form of a thin slurry during and after ammoniation, removing most of the undissolved solids as product from the ammoniated slurry and recycling the remaining aqueous liquor containing 10 to 50% solids in solution by addition to a succeeding acidulated reaction mixture to be ammoniated, the water in said aqueous liquor constituting a major portion of the water added to said succeeding reaction mixture prior to ammoniation thereof.

2. A process as defined in claim 1 wherein potassium chloride is incorporated into the fertilizer at a suitable stage and said aqueous recycle liquor is a saturated solution containing phosphate, sulfate, chloride, nitrate, ammonium, potassium and calcium ions, and said product is dried and granulated.

3. In the process of preparing a fertilizer material by treating phosphate rock in a liquid medium containing $H_2SO_4$ in a proportion of at least 2 equivalents for 3 equivalents of any other acid constituents present, the amount of total acid present being at least 33% in excess of that theoretically required to convert the phosphate content of the rock substantially to phosphoric acid, the water content of the reaction mixture being 8 to 120 parts per 100 parts of phosphate, and the acid concentration being such that the apparent acid strength of the resulting reaction mixture is not less than about 50%, adding an amount of water sufficient to decrease the acid strength of said mixture to between 35 and 15% and reacting the resulting mixture containing $H_3PO_4$ and $CaSO_4$, without any intervening curing period, with an ammoniating agent in amount sufficient to transform a major proportion of the phosphate content of said mixture to dicalcium phosphate and ammonium phosphate, said addition of water to decrease the apparent acid strength of the mixture prior to ammoniation resulting in an increase in ammoniation efficiency and rate of absorption of ammonia.

References Cited in the file of this patent

UNITED STATES PATENTS

| 709,185 | Terne | Sept. 16, 1902 |
| 1,445,167 | Plauson | Feb. 13, 1923 |
| 1,610,109 | Pease | Dec. 7, 1926 |
| 1,758,448 | Liljenroth | May 30, 1930 |
| 1,870,602 | Case | Aug. 9, 1932 |
| 1,930,883 | Oehme | Oct. 17, 1933 |
| 2,115,150 | Seyfried | Apr. 26, 1938 |
| 2,680,679 | Harvey | June 8, 1954 |

FOREIGN PATENTS

| 306,103 | Great Britain | Feb. 20, 1930 |
| 316,583 | Great Britain | Dec. 1, 1930 |
| 413,636 | Great Britain | July 12, 1934 |
| 590,660 | Great Britain | July 24, 1947 |
| 604,322 | Great Britain | July 1, 1948 |